United States Patent
Degen et al.

(10) Patent No.: US 6,254,000 B1
(45) Date of Patent: Jul. 3, 2001

(54) SYSTEM AND METHOD FOR PROVIDING A CARD TRANSACTION AUTHORIZATION FRAUD WARNING

(75) Inventors: Robert George Degen, Kennesaw, GA (US); Philip Thomas Mellinger, Ellicott City, MD (US)

(73) Assignee: First Data Corporation, Omaha, NE (US)

( * ) Notice: Subject to any disclaimer, the term of this patent is extended or adjusted under 35 U.S.C. 154(b) by 0 days.

(21) Appl. No.: 09/191,956

(22) Filed: Nov. 13, 1998

(51) Int. Cl.$^7$ ...................................................... G06K 5/00
(52) U.S. Cl. .............................. 235/380; 235/379; 705/44
(58) Field of Search ................................... 235/380, 375, 235/379, 382, 383, 494; 902/4, 26, 27, 28, 40; 705/16, 17, 39, 44, 64, 67, 75, 78

(56) References Cited

U.S. PATENT DOCUMENTS

| | | | |
|---|---|---|---|
| 4,114,027 | * | 9/1978 | Slater .................................. 902/40 X |
| 4,454,414 | * | 6/1984 | Benton .................................. 235/379 |
| 4,630,201 | * | 12/1986 | White .................................. 235/379 |
| 4,745,267 | * | 5/1988 | Davis et al. .......................... 235/379 |
| 5,101,098 | * | 3/1992 | Naito .................................. 235/379 X |
| 5,103,079 | * | 4/1992 | Barakai et al. ....................... 235/380 |
| 5,291,399 | * | 3/1994 | Chaco .................................. 235/375 X |
| 5,416,306 | * | 5/1995 | Imahata .................................. 235/380 |
| 5,432,326 | | 7/1995 | Noblett, Jr. et al. .................. 235/380 |
| 5,677,955 | * | 10/1997 | Dogget et al. ....................... 235/379 X |
| 5,679,940 | | 10/1997 | Templeton et al. .................. 235/380 |
| 5,754,653 | * | 5/1998 | Canfield .................................. 705/75 |
| 5,872,844 | * | 2/1999 | Yacobi .................................. 705/39 X |
| 5,878,138 | * | 3/1999 | Yacobi .................................. 705/44 X |
| 6,021,202 | * | 2/2000 | Anderson et al. .................. 705/44 X |
| 6,029,152 | * | 2/2000 | Bublitz et al. ....................... 705/17 X |
| 6,129,272 | * | 10/2000 | Hackett et al. ....................... 235/380 |
| 6,129,273 | * | 10/2000 | Yoshida et al. ....................... 235/379 |
| 6,182,894 | * | 2/2001 | Shah .................................. 235/380 |

FOREIGN PATENT DOCUMENTS 3-198261 * 8/1991 (JP) .
4-140896 * 5/1992 (JP) .

\* cited by examiner

Primary Examiner—Michael G. Lee
Assistant Examiner—Jared J. Fureman
(74) Attorney, Agent, or Firm—Morris, Manning & Martin, LLP

(57) ABSTRACT

Identifying and notifying credit card issuing banks of an increased risk of credit card fraud. An early warning system assists credit card transaction processors and credit card issuing banks reduce occurrences of credit card fraud. By analyzing transaction data and credit card account information, an authorization decision is made and transmitted to the merchant. The authorization decision either approves or denies the credit card transaction. Conventional authorization systems employ a security code that can be transmitted with an authorization request to limit authorization to transactions including the proper security code. Because some issuing banks do not utilize the security code system, they are exposed to an increased risk of credit card fraud. The early warning system can be used to monitor the authorization decisions that are transmitted by the processor to the merchant. By compiling data on the occurrences of mismatches between an expected security code and the security code provided by the authorization request, the early warning system can notify processors and/or issuing banks that they are exposed to an increased risk of credit card fraud. Additionally, the early warning system can detect attempts by credit card thieves to identify exposed banks. Detected attempts at credit card fraud can also be used to initiate investigations to apprehend credit card thieves.

21 Claims, 6 Drawing Sheets

| OBS | TRDATE | TRTIME | PAR | AMOUNT | INPUT | ENTRYM | MRCNUM | IRESULT | HRESULT | HSTANDIN | SCVOVERRN | TYPE | BINCA | INTNUM | INTCHAR | TRTIME |
|---|---|---|---|---|---|---|---|---|---|---|---|---|---|---|---|---|
| 1 | 09271998 | 2100522 | 5207008091002223 | 0000000004973 | H134 | 90 | 0001611647 | 01 | 00 | 5 | 1 | D | 520700 | 2 | 00 | 210000 |
| 2 | 09271998 | 0941183 | 5207008091030984 | 0000000000700 | H233 | 90 | 0000902078 | 01 | 00 | 5 | 0 | D | 520700 | 2 | 30 | 093000 |
| 3 | 09271998 | 1709026 | 5207008091001834 | 0000000002195 | H112 | 90 | 0000160121 | 01 | 00 | 5 | 0 | D | 520700 | 1 | 00 | 170000 |
| 4 | 09271998 | 1620112 | 5207008091037898 | 0000000005002 | H235 | 90 | 0000900209 | 01 | 00 | 5 | 0 | D | 520700 | 1 | 15 | 161500 |
| 5 | 09271998 | 0909414 | 5207008091049273 | 0000000002243 | ME02 | 90 | 0000990110 | 01 | 00 | 5 | 0 | D | 520700 | 0 | 00 | 090000 |
| 6 | 09271998 | 1816531 | 5207008091049828 | 0000000005935 | H133 | 90 | 0001612047 | 01 | 00 | 5 | 0 | D | 520700 | 1 | 15 | 181500 |
| 7 | 09271998 | 0903555 | 5207008091061096 | 0000000004870 | EN01 | 90 | 0000590213 | 00 | 00 | 5 | 0 | D | 520700 | 0 | 00 | 090000 |
| 8 | 09271998 | 1757386 | 5207008091068752 | 0000000001508 | ME02 | 90 | 0000990110 | 01 | 00 | 5 | 0 | D | 520700 | 3 | 45 | 174500 |
| 9 | 09271998 | 1331309 | 5207008091071053 | 0000000005565 | H214 | 90 | 0001612036 | 01 | 00 | 5 | 0 | D | 520700 | 2 | 30 | 133000 |
| 10 | 09271998 | 1901118 | 5207008091083363 | 0000000005178 | HI05 | 90 | 0001562006 | 01 | 00 | 5 | 0 | D | 520700 | 3 | 00 | 190000 |
| 11 | 09271998 | 1845311 | 5207008091085178 | 0000000006200 | H113 | 90 | 0001612012 | 01 | 00 | 5 | 0 | D | 520700 | 3 | 45 | 184500 |
| 12 | 09271998 | 2003145 | 5207008091086903 | 0000000002258 | H214 | 90 | 0001612033 | 01 | 00 | 5 | 0 | D | 520700 | 0 | 00 | 200000 |
| 13 | 09271998 | 1625111 | 5207008091089709 | 0000000002432 | ME02 | 90 | 0000990100 | 02 | 00 | 5 | 0 | D | 520700 | 1 | 15 | 161500 |
| 14 | 09271998 | 1203466 | 5207008091090384 | 0000000000408 | ME02 | 90 | 0000990102 | 02 | 00 | 5 | 0 | D | 520700 | 0 | 00 | 120000 |
| 15 | 09271998 | 0105461 | 5207008091111081 | 0000000000518 | ME02 | 90 | 0000990107 | 01 | 00 | 5 | 1 | D | 520700 | 0 | 00 | 010000 |
| 16 | 09271998 | 1753089 | 5207008091114488 | 0000000001946 | ME02 | 90 | 0000990145 | 02 | 00 | 5 | 0 | D | 521507 | 3 | 45 | 174500 |
| 17 | 09271998 | 2308477 | 5215077301804638 | 0000000000472 | H135 | 90 | 0002275803 | 02 | 00 | 5 | 0 | D | 528707 | 0 | 00 | 230000 |
| 18 | 09271998 | 1826200 | 5287071157107677 | 0000000004895 | DL01 | 90 | 0004511600 | 01 | 00 | 5 | 0 | D | 528707 | 1 | 15 | 181500 |
| 19 | 09271998 | 1514566 | 5287071206079656 | 0000000012733 | | 90 | 0000320115 | 01 | 00 | 5 | 1 | L | 528707 | 3 | 00 | 150000 |
| 20 | 09271998 | 1434239 | 5287071201054164 | 0000000016000 | | 90 | 0002780201 | 01 | 00 | 5 | 1 | L | 528707 | 2 | 30 | 143000 |
| 21 | 09271998 | 1801179 | 5287071201057746 | 0000000007... | | 90 | 0001662082 | 01 | 00 | 5 | 1 | D | 528707 | 3 | 45 | 180000 |

FIG. 3

| OBS | TRDATE | TRTIME | PAN | AMOUNT | INPORT | ENTRYM | MERCNUM | IRESULT | NRESULT | STANDIN | CVVERR2 | TYPE | BINCA | INTNUM | INTCHAR | TRTIME2 |
|---|---|---|---|---|---|---|---|---|---|---|---|---|---|---|---|---|
| 1 | 09271998 | 2100522 | 5207008091002223 | 000000004973 | H134 | 90 | 0001611647 | 00 | 00 | 5 | 1 | D | 520700 | 0 | 00 | 210000 |
| 2 | 09271998 | 0941183 | 5207008091030984 | 000000000700 | H233 | 90 | 0009020278 | 00 | 00 | 5 | 1 | D | 520700 | 2 | 00 | 093000 |
| 3 | 09271998 | 1709026 | 5207008091001834 | 000000002195 | H112 | 90 | 0000160121 | 00 | 00 | 5 | 1 | D | 520700 | 0 | 30 | 170000 |
| 4 | 09271998 | 1620112 | 5207008091037898 | 000000005002 | H235 | 90 | 0000900209 | 00 | 00 | 5 | 1 | D | 520700 | 1 | 00 | 161500 |
| 5 | 09271998 | 0909414 | 5207008091049273 | 000000002243 | H133 | 90 | 0000990110 | 00 | 00 | 5 | 1 | L | 520700 | 0 | 15 | 090000 |
| 6 | 09271998 | 1816531 | 5207008091049828 | 000000005935 | ME02 | 90 | 0001612047 | 00 | 00 | 5 | 1 | D | 520700 | 1 | 00 | 181500 |
| 7 | 09271998 | 0903555 | 5207008091061096 | 000000000700 | EN01 | 90 | 0000590213 | 00 | 00 | 5 | 1 | D | 520700 | 0 | 00 | 090000 |
| 8 | 09271998 | 1757386 | 5207008091068752 | 000000001508 | ME02 | 90 | 0000990110 | 00 | 00 | 5 | 1 | L | 520700 | 3 | 45 | 174500 |
| 9 | 09271998 | 1331309 | 5207008091071053 | 000000005565 | H105 | 90 | 0001612036 | 00 | 00 | 5 | 1 | D | 520700 | 2 | 30 | 133000 |
| 10 | 09271998 | 1901118 | 5207008091083363 | 000000006200 | H113 | 90 | 0001562006 | 00 | 00 | 5 | 1 | D | 520700 | 0 | 00 | 190000 |
| 11 | 09271998 | 1845311 | 5207008091085178 | 000000002258 | H214 | 90 | 0001612012 | 00 | 00 | 5 | 1 | D | 520700 | 3 | 45 | 184500 |
| 12 | 09271998 | 2003145 | 5207008091086903 | 000000002432 | ME02 | 90 | 0001612033 | 00 | 00 | 5 | 1 | D | 520700 | 2 | 00 | 200000 |
| 13 | 09271998 | 1625111 | 5207008091089709 | 000000000408 | ME02 | 90 | 0000990100 | 00 | 00 | 5 | 1 | L | 520700 | 1 | 15 | 161500 |
| 14 | 09271998 | 1203466 | 5207008091090384 | 000000000518 | ME02 | 90 | 0000990102 | 00 | 00 | 5 | 1 | L | 520700 | 0 | 00 | 120000 |
| 15 | 09271998 | 0105461 | 5207008091111081 | 000000001946 | H214 | 90 | 0000990107 | 00 | 00 | 5 | 1 | L | 520700 | 0 | 00 | 010000 |
| 16 | 09271998 | 1753089 | 5215077301804488 | 000000000472 | ME02 | 90 | 0000990145 | 00 | 00 | 5 | 1 | D | 521507 | 3 | 45 | 174500 |
| 17 | 09271998 | 2308477 | 5287071157107677 | 000000004895 | ME02 | 90 | 0002275803 | 00 | 00 | 5 | 1 | D | 528707 | 0 | 00 | 230000 |
| 18 | 09271998 | 1826200 | 5287071200679656 | 000000012733 | H135 | 90 | 0001511600 | 00 | 00 | 5 | 1 | L | 528707 | 1 | 15 | 181500 |
| 19 | 09271998 | 1514566 | 5287071201054164 | 000000016000 | DL01 | 90 | 0000120115 | 00 | 00 | 5 | 1 | D | 528707 | 0 | 00 | 150000 |
| 20 | 09271998 | 1434239 | 5287071201057746 | 000000000007 | | 90 | 0002780201 | 00 | 00 | 5 | 1 | L | 528707 | 2 | 30 | 143000 |
| 21 | 09271998 | 1801179 | 5287071201900242 | 000000000007 | | 90 | 0001662082 | 00 | 00 | 5 | 1 | D | 528707 | 3 | 45 | 180000 |

FIG. 5

SYSTEM AND METHOD FOR PROVIDING A CARD TRANSACTION AUTHORIZATION FRAUD WARNING

TECHNICAL FIELD

The present invention relates generally to credit card transaction authorization systems and more particularly relates to methods and systems for identifying security system failures and for alerting credit card issuers of an increased risk of credit card fraud.

BACKGROUND OF THE INVENTION

The convenience of making purchases or borrowing money through the use of a credit card has made credit card transactions more popular now than at any other time in history. Unfortunately, credit cards are vulnerable to fraud. Credit card fraud increases the cost of providing the convenience of credit card transactions to cardholders and merchants.

Credit cards are usually issued by an issuing bank. Issuing banks generally advance or loan a cardholder (consumer) the money that is exchanged in a credit card transaction. While the cardholder may use a credit card to simply borrow money from the issuing bank, the most common credit card transaction involves a cardholder and a merchant. The cardholder initiates the credit card transaction by permitting the merchant to charge a purchase against the cardholder's account with the issuing bank. Typically, the account is represented by an account number indicated somewhere on the cardholder's credit card.

Cardholder-merchant credit card transactions are typically executed by an electronic transfer of credit card transaction data over a data connection between the merchant and a credit card processing center. Such transaction data typically includes a sale amount, the merchant's identification number, and the transaction date. The processing center usually includes a transaction processor for executing credit card transactions and an authorization source for authorizing or declining a proposed credit card transaction. The authorization source performs or facilitates the function of authorizing or declining a proposed credit card transaction based on information about the cardholder's account. Such account information may include credit limits, security checks, card expiration dates, and the issuing bank's identification number (BIN). In short, the authorization source analyzes the account data and the transaction data to make an authorization decision about a particular transaction. Typically, the authorization process involves the communication of transaction data and account data between the processing center and the issuing bank before an authorization decision is made.

Early credit card fraud was perpetrated at the expense of issuing banks, by generating bogus account numbers that were valid for the purposes of executing at least one fraudulent credit card transaction. Issuing banks developed and utilized a standardized algorithm to create erratically non-sequential account numbers in an effort to avoid sequential account numbers. By avoiding sequential account numbers, valid account numbers could be hidden among a multitude of invalid account numbers. Unfortunately, credit card thieves developed a computer program that was capable of mimicking the standardized account number generating algorithm used by credit card issuers. By using the software package, valid account numbers could be uncovered and fraudulent credit card transactions could be successfully effected. Credit card thieves could simply input a known, valid account number into the algorithm and the next valid account number would be generated by the algorithm. The generated account number could be used to make fraudulent credit card transactions until the fraudulent activity was discovered and the account number inactivated.

Processing centers and issuing banks responded to this type of fraud by developing a security code that was a cryptographic representation of the account information for each valid account number. In the credit card industry, the security code is commonly referred to as either a Card Verification Value (CVV) or a Card Validation Code (CVC). For example, the security code of a particular credit card account may be the sum of all of the digits of the account number divided by the number of letters in the cardholder's first name. Thus, a credit card thief's knowledge of a valid account number was no longer a sufficient condition to the perpetration of credit card fraud.

Implementation of the security code as a prerequisite to a credit card transaction authorization significantly reduced credit card fraud. Unfortunately, many issuers still find themselves unprotected for various common reasons. One common reason is that a service misunderstanding exists between the issuer and the processing center, and the security code protection has not been enabled as a prerequisite to a credit card transaction authorization. Another common reason is that the issuer has chosen not to enable the security code protection. Whatever the reason, the absence of security code protection leaves the issuer exposed to an increased risk of credit card fraud.

Credit card thieves can determine exposed issuers by an activity referred to as "probing". Probing involves the submission to a processing center of multiple bogus credit card transactions or authorization requests, until an approval authorization is received. The bogus transactions are transmitted to the processing center containing a known, bogus security code. Because the credit card thief knows that the security code is bogus, he/she also knows that an approved credit card transaction indicates that the issuer of that account number is not using the security code as a prerequisite to authorization (i.e., the issuer is unprotected). With this knowledge in hand, the credit card thief can execute fraudulent credit card transactions using the account number and bogus security code, until the fraudulent activity is detected and the account number inactivated. Of course, other means of determining the identity of issuers that are so exposed may exist, such as in cases where inside knowledge of an issuer's security operations is passed to a credit card thief.

This kind of credit card fraud can be costly to the issuer, the merchant, and the cardholder. Additionally, many processing centers guarantee the authorization of a credit card transaction against credit card fraud. In such a case, the processing center may be ultimately responsible for any fraud. In all cases, consumers ultimately bear the burden of costs incurred through credit card fraud.

Accordingly, there is a need to overcome the limitations of the prior art by providing an early warning system for notifying issuers that they are exposed to an increased risk of credit card fraud. There is also a need for an early warning system that can provide information about suspected credit card thieves such that an investigation can be initiated to apprehend credit card thieves. The early warning system should be able to be implemented within the confines of an existing credit card authorization system, such that it has little impact on the normal operations of the authorization system.

SUMMARY OF THE INVENTION

The present invention solves the problems of the prior art by providing an early warning system for notifying issuing banks of an increased risk of credit card fraud. Thus, the early warning system can assist credit card processing centers (processing centers) and credit card issuing banks (issuers) in reducing occurrences of credit card fraud. Conventional credit card transaction authorization systems employ an exchange of corresponding authorization requests and authorization decisions to approve or deny the execution of a particular credit card transaction. A merchant transmits transaction data and a cardholder's account information to a processing center by way of an authorization request. By analyzing the transaction data and the transmitted account information as well as account information maintained by the processing center and/or supplied by the issuer, an authorization decision is made and transmitted to the merchant. The authorization decision either approves or declines the credit card transaction.

Conventional authorization systems employ a security code that can be transmitted with the authorization request or calculated by applying a standardized algorithm to the data contained in the authorization request. Ideally, an authorization decision will decline the execution of a credit card transaction in which the security code provided by the authorization request does not match the security code kept on file by the processing center and/or issuer. The security code algorithm is kept secret from credit card thieves to prevent thieves from utilizing bogus credit card accounts and security codes to trigger the approval of a fraudulent credit card transaction.

In one aspect of the invention, an early warning system is used to monitor the authorization decisions that are transmitted by the processing center to the merchant (or by the issuer to the processing center) on a per transaction basis. By compiling data on the occurrences of mismatches between the security code on file and the security code provided by the authorization request, the early warning system notifies processing centers and/or issuers when they are exposed to an increased risk of credit card fraud.

In another aspect of the invention, the early warning system can detect attempts by credit card thieves to identify unprotected issuers. Detected attempts at credit card fraud and detected executions of fraudulent transactions can be used to initiate investigations to apprehend credit card thieves.

These and other objects, features, and advantages of the present invention may be more clearly understood and appreciated from a review of the following detailed description and by reference to the appended drawings and claims.

BRIEF DESCRIPTION OF THE DRAWINGS

FIG. 3 is an illustration of an exemplary credit card transaction report depicting the data monitored and analyzed by an embodiment of the present invention.

FIG. 5 is an illustration of an exemplary credit card transaction report depicting the data extracted by an embodiment of the present invention in order to used to trigger an early warning alarm.

DETAILED DESCRIPTION OF EXEMPLARY EMBODIMENTS

Figure 1A:
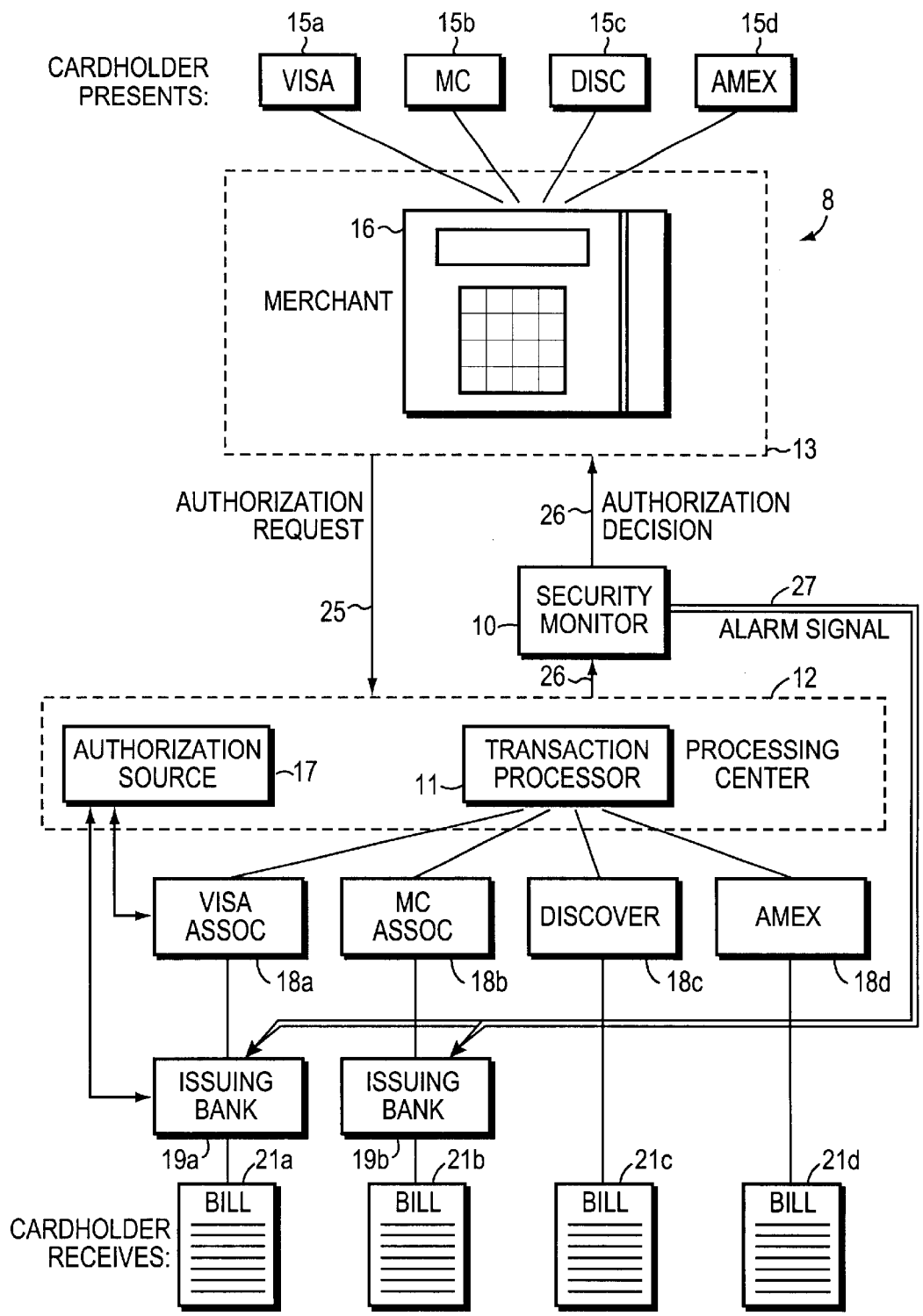
FIG. 1a is a block diagram of an exemplary embodiment of a credit card transaction authorization system.

Referring now to the drawings, in which like numerals indicate like elements throughout the various figures, FIG. 1a illustrates generally a credit card transaction authorization system 8 used to process credit card transactions. An early warning system can be implemented by use of a security monitor 10 that is used to assist credit card transaction processing centers (processing centers) 12 and credit card issuing banks (issuers) 19a–b in reducing occurrences of credit card fraud. Conventional credit card transaction authorization systems employ an exchange of corresponding authorization requests 25 and authorization decisions 26 to approve or deny the execution of a particular credit card transaction. A merchant 13 transmits transaction data and a cardholder's account information to a processing center by way of an authorization request. By analyzing the transaction data and the transmitted account information as well as account information maintained by the processing center 12 and/or supplied by the issuer 19a–b, an authorization decision 26 is made and transmitted to the merchant. The authorization decision 26 typically either approves or declines the credit card transaction.

Conventional authorization systems employ a security code that can be transmitted with the authorization request 25 or calculated by applying a standardized algorithm to the data contained in the authorization request. Ideally, an authorization decision 26 will decline the execution of a credit card transaction in which the security code provided by the authorization request 25 (or calculated from the data provided in the authorization request) does not match the security code kept on file by the processing center 12 and/or issuer 19a–b. The security code and/or security code algorithm can be kept secret from credit card thieves to prevent thieves from utilizing bogus credit card accounts and security codes to effect the approval of a fraudulent credit card transaction.

An exemplary early warning system can utilize a security monitor 10 to monitor the authorization decisions 26 that are transmitted by the processing center 12 to the merchant 13 on a per transaction basis. By compiling data on the occurrences of mismatches between the security code on file (actual security code) and the security code provided by the authorization request (transaction security code), the early warning system can notify processing centers 12 and/or issuers 19a–b that they are exposed to an increased risk of credit card fraud. Additionally, the early warning system can detect attempts by credit card thieves to identify exposed banks. Detected attempts at credit card fraud and detected fraudulent transactions can be used to initiate investigations to apprehend credit card thieves.

In view of the foregoing, it will be understood that the present invention operates in conjunction with an existing credit card transaction authorization system to incorporate an early warning system. It will be further understood that the authorization requests 25 and authorization decisions 26 are primarily based upon conventional techniques and known protocols for credit card authorization systems. While the invention is described as embodied in a credit card authorization system, the term "credit card" is meant to incorporate any device (e.g., a debit card) capable of operating in conjunction with a financial authorization system, as described herein. Accordingly, prior to describing the embodiments of the present invention, it will be useful to first review the primary components and operation of a typical credit card authorization system.

A Credit Card Transaction Authorization System

Referring still to FIG. 1a, the authorization system 8 utilizes a processing center 12 (which could be a credit card issuer or an independent processing center) for credit card transaction processing. Such processing typically includes "clearing" and/or "settling" credit card transactions. Clearing credit card transactions refers to the process by which data pertaining to a merchant's credit card transaction (transaction data) is transferred to an issuer. Settlement refers to the process by which funds are transferred from a card issuer to a merchant. Clearing and settlement are performed by the transaction processor 11, which is a component of the processing center 12.

A merchant 13 may transmit transaction data to the processing center 12 electronically or in the form of paper sales drafts. The data is typically transferred from the processing center to the issuer 19a–b electronically. Once the issuer 19a–b receives the transaction data, the transactions are posted to the appropriate cardholder's account or stored for subsequent posting to the appropriate cardholder's account. Settlement occurs as funds are transferred from the issuer 19a–b to the merchant 13.

Another component of the processing center 12 is the authorization source, which is responsible for generating authorization decisions 26. In a typical transaction, a cardholder proposes to purchase goods or services and presents a credit card, such as one of the types 15a–d, to the merchant 13 as the method of payment. In some cases, the merchant communicates with the authorization source 17 component processing center 12 an in order to have the proposed transaction approved prior to executing the transaction. In other cases, the merchant 13 communicates with a separate authorization source (not shown) for requesting transaction authorization. The authorization source 17 communicates, in turn, with the issuer 19a–b or with a card issuing association 18a–d. Card issuers 19a–b often belong to card issuing associations 18a–d. A card issuing association provides services to the issuers 19a–b and cardholders and are often used to create standards of practice for the execution of credit card transactions. The terms issuer and card issuing associations are often used synonymously to mean an entity that is responsible for issuance and/or regulation of transactions involving certain data cards. After communicating with the issuer 19a–b, the processing center 12 transmits an authorization decision 26 to the merchant 13 either approving or declining the credit card transaction.

If a credit card transaction is approved, the merchant receives an authorization number or code from the processing center 12, which is recorded along with the other transaction data. The authorization number is significant, because it provides a means for tracking a particular transaction. For the merchant, the authorization number provides a kind of confirmation number, providing evidence that the merchant followed proper authorization procedure. In response to the authorization request, the merchant 13 may also receive an authorization decision declining the credit card transaction. In this case, the credit card transaction is usually terminated.

The authorization process (whether performed by the processing center 12 or a separate authorization source) involves the analysis of transaction data and account data provided by the authorization request and/or by data maintained by the processing center 12 or issuer 19a–b. Typically, the processing center 12 will transmit the transaction data to the issuer 19a–b for further analysis. Particularly, the issuer 19a–b will analyze the transaction data received from the merchant 13 and will compare the transaction data with the cardholder's account information. The issuer 19a–b will then transmit an authorization decision to the processing center 12 which will be forwarded to the merchant 13, as described above.

The merchant 13 typically uses an electronic terminal 16 to record the data pertaining to the transaction. The recorded data includes the account number and expiration date of the cardholder's account, the amount and date of the transaction, the authorization number (if approved) and the cardholder's signature. The terminal 16 is typically equipped with a card reader (not shown). The cardholder's account data is input into the terminal 16 by swiping the card through the card reader.

Periodically, the merchant 13 transfers the data from all of the credit card transactions to the processing center 12 so that the transactions may be settled. Some processing centers 12 handle transactions for different types of credit cards (e.g., more than one issuer 19a–b), thereby obviating the need for the merchant 13 to communicate with each issuer 19a–b or card issuing association 18a–d. In such cases, the processing center 12 separates each merchant's transactions according to the corresponding issuer 19a–b. Typically, a credit card account number will include an identifier of the issuer 19a–b, referred to as a bank identification number (BIN). Merchant transactions can be sorted according to BINs. The processing center 12 can then forward the sorted credit card transactions to the respective issuer 19a–b or card issuing association 18a–d for subsequent settlement.

An exemplary embodiment of the present invention can be implemented as a component of the processing center 12 or the authorization source 17. Alternatively, the early warning system can be implemented as a stand-alone security monitor 10. Those skilled in the art will appreciate that the implementation of an embodiment of the present invention is dictated more by access to the communications (e.g., the authorization decision 26) between merchant 13, processing center 12, and/or issuer 19a–b than by physical location.

The authorization system 8 may employ a security code that can be transmitted with the authorization request or calculated by applying a standardized algorithm to the data contained in the authorization request. Ideally, an authorization decision will decline a credit card transaction in which the security code provided by the merchant 13 (or calculated from the data provided from the merchant) does not match the security code kept on file by the processing center 12 and/or issuer 19a–b. The security code and/or security code algorithm can be kept secret from credit card thieves to prevent thieves from utilizing bogus credit card accounts and security codes to trigger the approval of a fraudulent credit card transaction.

Although the conventional transaction authorization systems provide for transaction authorization, the systems do not allow for the implementation of an early warning system to alert issuers 19a–b and/or card issuing associations that they are approving transactions with security code mismatches. Thus, the conventional system allows credit card thieves to infiltrate authorization operations and probe for unprotected issuers. Ultimately, the conventional system permits credit card thieves to execute fraudulent credit card transactions.

Figure 1B:
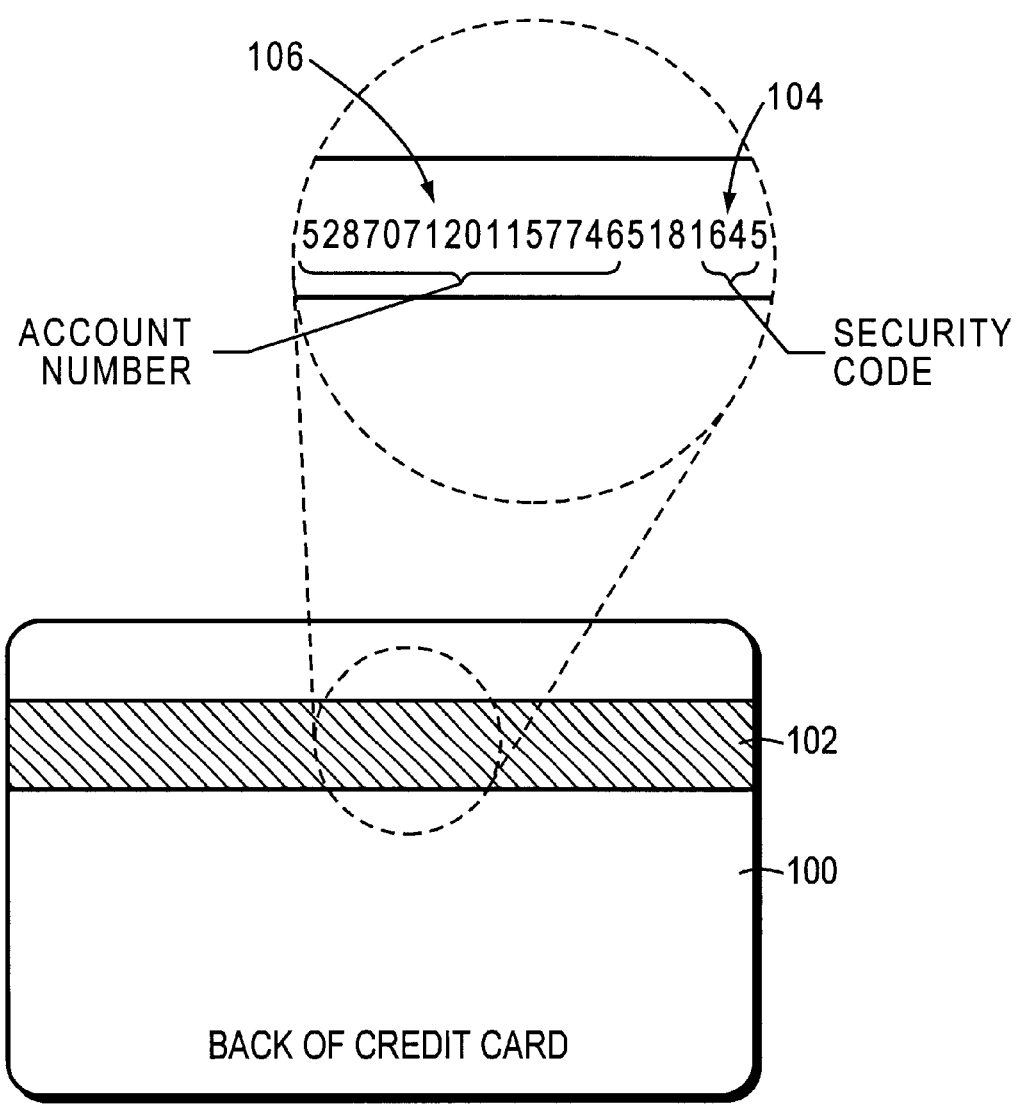
FIG. 1b is an illustration of an exemplary credit card with a magnetic stripe containing encoded account information.

Turning now to FIG. 1b, an exemplary credit card 100 is depicted, with a magnetic stripe 102 on the back of the credit card. The magnetic stripe typically includes an encoded representation of the account number 106 corresponding to the credit card 100. A security code 104 is encoded into the magnetic stripe 102 on the back of the credit card 100. The security code 104 can be transmitted from the merchant to the processing center as part of the transaction data associated with a particular credit card transaction. Typically, the magnetic stripe 102 of a credit card 100 is read at the point of the transaction by the electronic terminal 16 (FIG. 1a). The data on the magnetic stripe 102 typically conforms to a protocol or standard promulgated by a card issuing association or group of card issuing associations. A more detailed discussion of the data protocol of a conventional magnetic stripe can be found in U.S. Pat. No. 5,432,326, which issued to a subsidiary of First Data Corporation, to which the present application is assigned. The disclosure of that patent is hereby incorporated by reference.

An Exemplary Method for Credit Card Transaction Authorization

Figure 2:
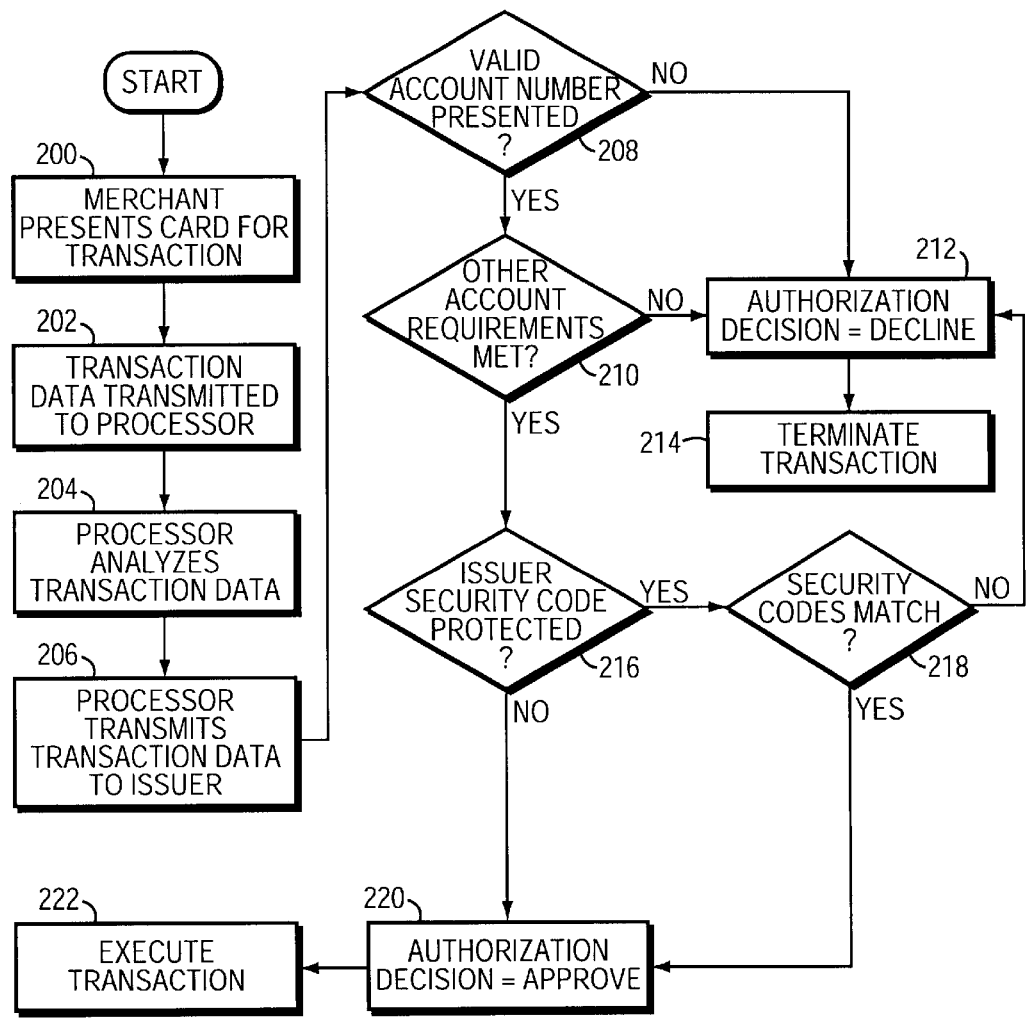
FIG. 2 is a flow chart diagram that shows the steps for an exemplary method for authorizing a credit card transaction.

Referring now to FIG. 2, an exemplary method for generating an authorization decision is depicted. The method begins at step 200, in which the merchant presents a credit card for a credit card transaction. As described in connection with FIG. 1a, this is usually done by swiping a cardholder's credit card through an electronic terminal. The method proceeds to step 202 in which the transaction data is transmitted from the merchant to the authorization source of the processing center. Next, the processing center analyzes the transaction data at step 204. At step 204, the processing center may limit its analysis to a verification that all relevant data has been transmitted in order to execute a meaningful authorization process. Alternatively, the processing center may maintain all issuer data locally, such that the entire authorization procedure can be effected at the processing center level, without a transmission to the issuer. In the method depicted in FIG. 2, however, the method proceeds to step 206 and the transaction data is transmitted to the issuer.

Once the issuer has received the transaction data, the method proceeds to decision block 208 at which a determination is made as to whether the transaction data includes a valid account number. If the account number presented is not valid, then the method branches to step 212 and the authorization decision declines the execution of the transaction. From step 212, the method proceeds to step 214 at which the transaction is terminated.

Returning to decision block 208, if a determination is made that the account number presented is valid, then the method branches to decision block 210. At decision block 210, a determination is made as to whether other account requirements have been met. Those skilled in the art will appreciate that these requirements depend on the nature of the transaction and can vary among issuers. For the purposes of this discussion it is sufficient to state that such requirements can include the credit limit applicable to the account, the transaction amount, and the expiration date of the presented credit card.

If the other account requirements are not met, then the method branches from decision block 210 to step 212 and the transaction is terminated as described above. On the other hand, if the other account requirements are met, then the method branches to decision block 216. At decision block 216, a determination is made as to whether the issuer is security code protected. That is, whether the issuer requires a match between a presented security code (transaction security code) and an actual security code on file or calculable from other account information. If the issuer is security code protected, then the method branches to decision block 218 wherein a determination is made as to whether the transaction security code and the actual security code match. If the security codes match, then the method branches to step 220 and the transaction is approved. The method then proceeds to step 222 and the transaction is executed. On the other hand, if the security codes do not match at decision block 218, then the method branches to step 212 and the transaction is terminated as described above.

Returning now to decision block 216, a determination that the issuer is not security code protected results in the method branching to step 220 and the transaction is executed as described above. Notably, if the issuer is not security code protected, then no determination is made as to whether the presented security code is valid. This flaw in the conventional authorization system has been exploited by credit card thieves, as will be discussed in more detail below. An exemplary embodiment of the present invention is directed to providing an early warning system for notifying issuers that they are exposed to such credit card fraud, before any credit card fraud transpires.

Credit Card Fraud

The conventional authorization system described above can be exploited by credit card thieves to defraud merchants, processing centers, and cardholders. By identifying issuers that do not require a security code match as a prerequisite to a transaction authorization, credit card thieves can avert the security precautions of a conventional authorization system.

While credit card thieves have developed a system for generating valid account numbers, they have not yet deciphered the means by which credit card issuers generate security codes. In a case in which the credit card thief has generated a valid account number, he/she will still be prevented from executing any fraudulent transactions as long as the security code associated with that valid account number is unknown by the thief and is required by the issuer as a prerequisite to an approval of the credit card transaction.

However, there are situations in which the issuer does not require a security code match as a prerequisite to an approval of a credit card transaction. If the issuer has not arranged with the processing center to require a security code match, then the issuer will be unprotected from a thief with a valid account number. If the issuer removes security code protection for a period, the issuer will be similarly unprotected. This may happen at times that the issuer is performing maintenance operations on its computer systems or other times. Whatever the reason for the security code failure, the inventors have determined that many issuers are not protected and are, therefore, exposed to an increased risk of credit card fraud during the period of no security code protection.

Credit card thieves can determine unprotected issuers by various means. The most focused means is to acquire information from an informant who is aware of the security operations of a particular issuer. A less focused but more common means is to "probe" account numbers until an unprotected issuer is found. Probing involves the submission to a processing center of multiple bogus credit card transactions, until an approval authorization is received. The bogus transactions are transmitted to the processing center containing a known, bogus security code. Because the credit card thief knows that the security code is bogus, he/she also knows that an authorized credit card transaction indicates that the issuer of that account number is not requiring a security code match as a prerequisite to authorization. With this knowledge in hand, the credit card thief can effect fraudulent credit card transactions using the account number and bogus security code, until the fraudulent activity is detected and the account number inactivated. Moreover, the thief can generate other account numbers associated with the unprotected issuer's BIN to execute even more fraudulent transactions.

Where the issuer is unaware of its unprotected status, the problem is especially acute. The early warning system of an exemplary embodiment notifies unprotected issuers of transactions or authorization requests that have been processed and approved despite a security code mismatch. An exemplary detection and early warning system and method are described in more detail below.

An Exemplary Early Warning System

Advantageously, the early warning system of an exemplary embodiment of the present invention can be implemented within the confines of the conventional authorization system. As is known to those skilled in the art, the functions of the authorization system described in FIG. 1a are typically provided by means of a computerized system at the processing center and/or authorization source. Merchants typically utilize electronic terminals to communicate with the computers of the authorization system. Transaction data, account data, and authorization decisions are electronically communicated freely among the processing center, authorization source, issuers, card issuing associations, and merchants. A more detailed description of the operation of an exemplary authorization system can be found in U.S. Pat. No. 5,432,326.

The early warning system of an exemplary embodiment of the present invention can be utilized as a program module running on a computer of the authorization system or as a separate dedicated computer system having access to authorization decisions and/or authorization requests of the authorization system. Referring again to FIG. 1a, the security monitor 10 has access to the authorization decision 26 that is transmitted from the processing center 12 to the merchant 13. By monitoring the data in the authorization decisions 26, the security monitor 10 can identify the occurrences of security code mismatches and transmit an alarm signal 27. The alarm signal 27 can be transmitted via a hardwire connection between the security monitor 10 and the issuer 19a–b, or any other means of transmitting an alarm signal. Those skilled in the art will appreciate that the security monitor 10 and the early warning system as a whole could be implemented as a component of a processing center 12, a component of an authorization source 17, or as a standalone system external to either the processing center or authorization source, as shown in FIG. 1a.

Referring now to FIG. 3, a data report is shown, containing some of the data that is contained in an exemplary authorization decision. The first column 300 is a simple index for keeping track of monitored authorization decisions for a given monitoring period. The second column 302 and third column 304 maintain the transaction date and transaction time, respectively, for each authorization decision monitored. The fourth column 306 contains the account number of the credit card presented for each transaction. The fifth column 308 contains the transaction amount in dollars for each transaction corresponding to an authorization decision. The seventh column 310 indicates the method used to execute each transaction. A "90" in the seventh column 310 indicates that the transaction was executed by swiping a credit card through an electronic terminal. Because the magnetic stripe of a credit card contains the security code, this method of transaction execution will provide the most common means of monitoring authorization decisions for security code mismatches.

The eighth column 312 of the report identifies the merchant presenting the credit card for the transaction. The ninth column 313 is especially significant to the early warning system because it represents the approve/decline field of the authorization decision. A value of "00" in the ninth column 313 indicates that the authorization decision is an approval. Any other value indicates a declined transaction. Although security code mismatches can be detected in authorization decisions declining execution of the transaction, authorization decisions containing approvals are most valuable, because they identify situations where the transaction has been approved despite a mismatch. The fourteenth column 316 contains the issuer's identification number (BIN) corresponding to each transaction.

Finally, the twelfth column 314 of the report contains a flag that indicates the existence of a mismatch for each transaction. A "1" value in the twelfth column 314 indicates that a mismatch has been detected between the security code presented by the merchant and the security code that is associated with the account number provided in the fourth column 306. A "0" value indicates that a mismatch has not been detected. By using the raw data shown in FIG. 3, an exemplary early warning system can extract relevant data to determine when a risk alarm should be generated to notify an issuer of an increased risk of credit card fraud.

Three transactions in the report shown in FIG. 3 provide examples of the operation of the early warning system. Transaction 318 includes a "1" in column 314, indicating that the transaction includes a security code mismatch. However, transaction 318 also includes a "01" indicating that the transaction was declined. Because the transaction was declined, there is no reason to send an alarm to the issuer—a transaction including a security code mismatch is supposed to be declined. Transaction 320 includes a "00" in column 313 indicating that the transaction was approved, but the "0" in column 314 indicates that no security code mismatch was detected. Transaction 320 depicts an example of the vast majority of transactions that are processed by the processing center—no alarm is necessary, because no mismatch occurred. Finally, transaction 322 depicts a transaction for which an alarm should be generated. The transaction has been approved, as indicated by the "00" in column 313, but a mismatch has been detected, as indicated by the "1" in column 314. The early warning system of an exemplary embodiment of the present invention will detect this transaction, extract the data, and generate an alarm if all other conditions have been satisfied. The following discussion describes the operation of an exemplary early warning system.

An Exemplary Method for Providing an Early Warning System

Figure 4:
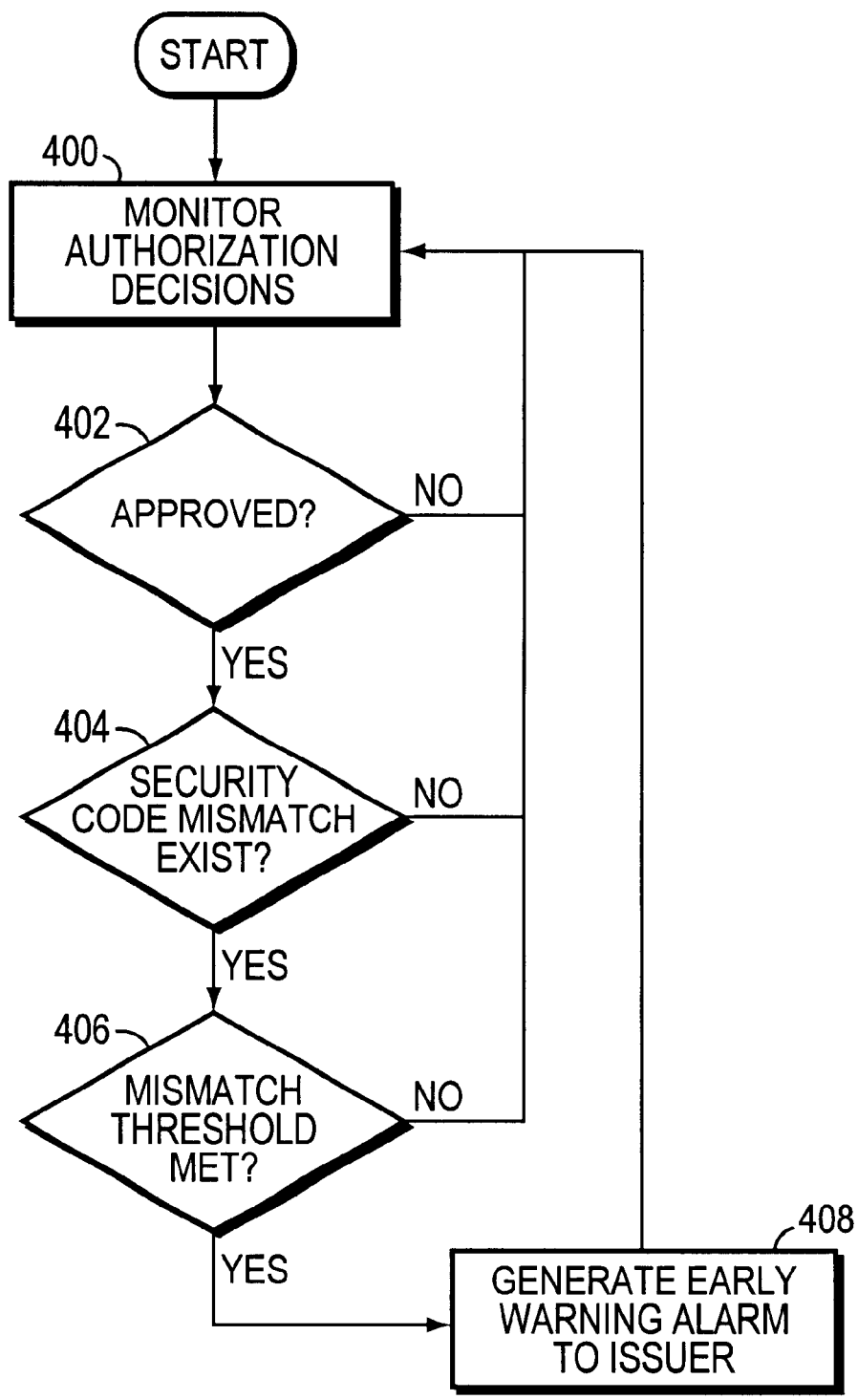
FIG. 4 is a flow chart diagram that shows the steps for an exemplary method for providing an early warning system for alerting a credit card issuer of an increased risk of credit card fraud.

Turning now to FIG. 4, an exemplary method for generating an early warning alarm is depicted. The method begins at step 400, in which the authorization decisions are monitored. That is, the data content of the authorization decisions being transmitted from the issuer to the processing center or from the processing center to the merchant is analyzed. The method proceeds to step 402 at which a determination is made as to whether a particular authorization decision monitored represents a credit card transaction approval. If the authorization decision declines the credit card transaction, then the method branches back to step 400 and continues monitoring authorization decisions. If the authorization decision approves the credit card transaction, then the method branches to decision block 404.

At decision block 404, a determination is made as to whether the authorization decision includes an indication that a security code mismatch occurred. If a security code mismatch did not occur for the monitored authorization decision, then the method branches back to step 400 and continues monitoring authorization decisions. If a security code mismatch did occur, then the method branches to decision block 406 where a determination is made as to whether a mismatch threshold has been met.

In order to avoid mismatch false alarms created by errant data (or other causes), a mismatch threshold can be set for each issuer. The mismatch threshold is a predetermined measure of the early warning system's tolerance for detected mismatches. An alarm will not be generated unless the number of detected mismatches exceeds the mismatch threshold level. An issuer who performs only a few transactions may want to know about every transaction with a mismatch, while an issuer with a high volume of credit card transactions may desire to configure the early warning system with a higher tolerance. Thus, if the mismatch threshold has not been met, then the method branches back to step 400 and continues monitoring authorization decisions. If the threshold has been met, then the method branches to step 408 and an early warning alarm is generated to the issuer identified in the authorization decision. After the alarm has been generated, the method branches back to step 400 and continues monitoring authorization decisions.

Referring now to FIG. 5, some of the data that an exemplary embodiment of the present invention extracts from an authorization decision is depicted in a report format used by an exemplary early warning system. The data is generated by applying the method described above in connection with FIG. 4 to the raw data depicted in FIG. 3. Based on the data in the report, a determination can be made as to whether an alarm should be generated.

As stated above, a "00" in the ninth column 513 indicates that the transaction has been approved. Thus, an approved transaction having a "1" in the twelfth column 514 indicates that the issuer is not requiring the security code match as a prerequisite to approval of the transaction. Because the BIN corresponding to the transaction is also known, such a transaction can be traced to a particular issuer and an alarm can be transmitted to the issuer. Ideally, the alarm will reach the issuer prior to the execution of any fraudulent transactions. In any case, the alarm will serve as a means for minimizing the unprotected issuer's exposure to credit card fraud. The report depicted in FIG. 5 illustrates a database that can be generated by filtering the raw data according to the authorization and security code mismatch parameters described above.

The early warning alarm discussed above can take the form of an electronic data message transmitted to the issuer. Alternatively, the alarm can manifest itself to the processing center, thus altering future processing of transactions for a particular issuer. For example, if the transaction data includes a transaction amount exceeding a predetermined level, an alarm may trigger the cessation of credit card transaction processing for that issuer. In such a case, a credit card thief may have made a single fraudulent transaction that presents such a substantial risk that the issuer is unwilling to provide services to any cardholder until the security code protection is restored.

As yet another alternative, the alarm could be transmitted to the merchant. Such an alarm might be useful in order to inform a thief that his attempted or executed transaction had been detected or to notify the merchant that the cardholder is actually a credit card thief.

Because the credit card industry is ever-growing, there exists a demand for investigative services directed to the apprehension of credit card thieves. The early alarm system of an exemplary embodiment of the present invention can also serve to generate data and evidence for such investigations. The inventors contemplate that even in cases in which no alarm is actually generated, the monitoring and detection of probing and fraudulent authorization requests by credit card thieves will be utilized to create a valuable database for providers of such investigative services.

The above description is directed toward the exemplary embodiment of the present invention in which an early warning alarm is generated to identify an increased level of risk of credit card fraud within the context of a credit card transaction authorization system. However, those skilled in the art will appreciate the invention can be utilized within the context of other financial authorization applications, such as debit card authorization systems and check authorization systems. The above description is not intended to limit the application of the invention to credit card authorization systems. Moreover, the term "credit card" is meant to incorporate any device (e.g., a debit card) capable of operating in conjunction with a financial authorization system, as described herein.

We claim:

1. A system for notifying an issuing bank of an increased risk of card fraud, comprising:

a terminal for obtaining and transmitting transaction data corresponding to a particular transaction;

the terminal including a card reader for obtaining card identifying information relating to a card tendered in connection with the particular transaction;

a transaction processor for receiving the transaction data from the terminal and for transmitting an authorization decision to the terminal;

a monitoring means for monitoring the authorization decision, determining an actual security code, and comparing the actual security code to a transaction security code; and the monitoring means further operating to generate a risk alarm, in response to a mismatch between the actual security code and the transaction security code when the authorization decision is a transaction approval.

2. The system of claim 1, wherein a portion of the card identifying information is the actual security code.

3. The system of claim 1, wherein the actual security code is calculable from at least a portion of the card identifying information.

4. The system of claim 1, wherein the transaction data includes an account number and actual security code corresponding to the card.

5. The system of claim 1, wherein at least a portion of the authorization decision contains a security code mismatch flag.

6. The system of claim 1, wherein the monitoring means is further operative to terminate the particular transaction, in response to a detection of a mismatch between the actual security code and the transaction security code.

7. The system of claim 1, further comprising a mismatch threshold, wherein the monitoring means is further operative to suppress the generation of the risk alarm until the mismatch threshold has been exceeded.

8. The system of claim 1, wherein the risk alarm is transmitted to the issuing bank.

9. The system of claim 1, wherein the risk alarm is transmitted to the transaction processor.

10. The system of claim 1, further comprising an alarm database, wherein transaction data and card identifying information can be stored, in response to the generation of a risk alarm.

11. A method of operating an authorization system to notify an issuing bank of its exposure to card fraud, comprising the steps of:

receiving an authorization decision from a transaction processor;

determining an actual security code;

comparing the actual security code to a transaction security code included in the authorization decision; and generating a risk alarm in response to a mismatch between the actual security code and the transaction security code when the authorization decision is a transaction approval.

12. The method of claim 11, wherein the step of determining the actual security code comprises identifying the actual security code within the authorization decision.

13. The method of claim 11, wherein the step of determining the actual security code comprises calculating the actual security code from at least a portion of the authorization decision.

14. The method of claim 11, wherein at least a portion of the authorization decision contains a security code mismatch flag.

15. The method of claim 11, further comprising the step of terminating a card transaction, in response to a mismatch between the actual security code and the transaction security code.

16. The method of claim 11, wherein the generating step comprises the steps of:

checking a mismatch threshold; and generating the risk alarm, in response to a determination that the mismatch threshold has been exceeded.

17. A method of operating an authorization system to notify an issuing bank of an increased risk of card fraud, comprising the steps of:

receiving transaction data from a transaction terminal, the transaction data corresponding to a particular transaction;

transmitting an authorization request to the issuing bank the authorization request including at least a portion of the transaction data;

receiving from the issuing bank a risk an authorization decision including a mismatch flag; and transmitting to the issuing bank a risk alarm, in response to a determination that the mismatch flag indicates a mismatch between a transaction security code and an actual security code when the authorization decision is a transaction approval.

18. The method of claim 17, wherein at least a portion of the authorization decision contains the actual security code.

19. The method of claim 17, further comprising the step of terminating the particular transaction, in response to a determination that the mismatch flag indicates a mismatch between the transaction security code and the actual security code.

20. The method of claim 17, wherein the transmitting step comprises the steps of:

checking a mismatch threshold; and transmitting the risk alarm to the issuing bank, in response to a determination that the mismatch threshold has been exceeded.

21. The method of claim 17, further comprising the step of storing transaction data and at least a portion of the authorization decision in an alarm database, in response to the transmission of a risk alarm.

\* \* \* \* \*